US012423980B2

(12) United States Patent
Dryer et al.

(10) Patent No.: US 12,423,980 B2
(45) Date of Patent: *Sep. 23, 2025

(54) DRONE BASED AUTOMATED YARD CHECK

(71) Applicant: BNSF Railway Company, Fort Worth, TX (US)

(72) Inventors: Nicholas Dryer, North Barrington, IL (US); Zachery Bettis, Fort Worth, TX (US); Bryan Gabric, Weatherford, TX (US); Michael I. Ibanez, McAllen, TX (US); Yasha Hajizeinalibiouki, Plano, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,673

(22) Filed: Jun. 28, 2024

(65) Prior Publication Data

US 2024/0355122 A1    Oct. 24, 2024

Related U.S. Application Data

(63) Continuation of application No. 18/340,151, filed on Jun. 23, 2023, now Pat. No. 12,056,931, which is a
(Continued)

(51) Int. Cl.
*G06V 20/50* (2022.01)
*G01S 19/45* (2010.01)
(Continued)

(52) U.S. Cl.
CPC .............. *G06V 20/50* (2022.01); *G01S 19/45* (2013.01); *G06Q 10/087* (2013.01); *G06T 7/70* (2017.01);
(Continued)

(58) Field of Classification Search
None
See application file for complete search history.

(56) References Cited

U.S. PATENT DOCUMENTS 7,805,227 B2    9/2010   Welles et al.
9,944,390 B2    4/2018   Ljubuncic et al.
(Continued)

OTHER PUBLICATIONS

Wu et al., Deep Learning for UAV-based Object Detection and Tracking: A Survey, Oct. 25, 2021.

*Primary Examiner* — Eileen M Adams
(74) *Attorney, Agent, or Firm* — Whitaker Chalk Swindle & Schwartz PLLC; Enrique Sanchez, Jr.

(57) ABSTRACT

Methods and systems for providing mechanisms for automated inventory control are provided. In embodiments, an operational workflow for providing automated inventory control includes automated data collection and automated image data analysis. The automated data collection includes capturing image data for a storage facility by a capturing device (e.g., an unmanned aerial system (UAS)). The automated image data analysis includes functionality to detect objects (e.g., containers, trailers, empty slots, and/or other objects) appearing in the image data (e.g., using a machine learning (ML) model), to identify the objects in the image data (e.g., using the ML model), to inspect the objects (e.g., including determining a condition and/or location of the objects) based on the collected image data and metadata associated with the image capturing device and correlated to the image data (e.g., using an advance mathematical rule-based analysis), and/or to generate results that may be used by an inventory management system.

20 Claims, 5 Drawing Sheets

Related U.S. Application Data continuation of application No. 17/822,999, filed on Aug. 29, 2022, now Pat. No. 11,688,169.

(51) Int. Cl.

| | | |
|---|---|---|
| *G06Q 10/087* | (2023.01) | |
| *G06T 7/70* | (2017.01) | |
| *G06V 10/70* | (2022.01) | |
| *G06V 20/17* | (2022.01) | |
| *G06V 20/40* | (2022.01) | |
| *H04N 5/77* | (2006.01) | |
| *H04N 7/18* | (2006.01) | |

(52) U.S. Cl.
CPC .............. *G06V 10/70* (2022.01); *G06V 20/17* (2022.01); *G06V 20/41* (2022.01); *H04N 5/77* (2013.01); *H04N 7/183* (2013.01); *G06T 2207/10016* (2013.01); *G06T 2207/10032* (2013.01); *G06T 2207/30244* (2013.01); *G06V 2201/10* (2022.01)

(56) References Cited

U.S. PATENT DOCUMENTS

| | | | |
|---|---|---|---|
| 10,187,616 | B2 | 1/2019 | Shondel |
| 10,597,054 | B2 | 3/2020 | Arndt et al. |
| 10,706,386 | B2 | 7/2020 | Trivelpiece et al. |
| 11,098,455 | B2 | 8/2021 | Joshi et al. |
| 11,164,149 | B1 | 11/2021 | Williams et al. |
| 11,688,169 | B1 * | 6/2023 | Dryer ...................... H04N 5/77 348/144 |
| 12,056,931 | B2 * | 8/2024 | Dryer .................. G06Q 10/087 |
| 2017/0337470 | A1 * | 11/2017 | DeTone .................... G06T 7/12 |
| 2018/0189936 | A1 * | 7/2018 | Christ .................. G06T 3/4007 |
| 2019/0054937 | A1 | 2/2019 | Graetz et al. |
| 2019/0066234 | A1 | 2/2019 | Bedoya et al. |
| 2019/0135315 | A1 | 5/2019 | Dargy et al. |
| 2019/0267041 | A1 | 8/2019 | Ricciardi |
| 2019/0372773 | A1 * | 12/2019 | Bertsch ............... G06F 16/5854 |
| 2020/0241522 | A1 | 7/2020 | Selvakani et al. |
| 2020/0357123 | A1 * | 11/2020 | Ichikawa ............... G06V 20/52 |
| 2021/0105406 | A1 * | 4/2021 | Cho .................... H04N 1/32128 |
| 2021/0142268 | A1 | 5/2021 | Brooks et al. |
| 2023/0125477 | A1 * | 4/2023 | Gurumurthy ............ G06N 3/08 382/103 |

\* cited by examiner

DRONE BASED AUTOMATED YARD CHECK

CROSS-REFERENCE TO RELATED APPLICATIONS

The present application is a Continuation application of U.S. patent application Ser. No. 18/340,151, filed Jun. 23, 2023, which is a Continuation application of U.S. patent application Ser. No. 17/822,999, filed Aug. 29, 2022, the contents of which are incorporated herein in their entirety for all purposes.

TECHNICAL FIELD

The present disclosure relates generally to automated inventory management, and more particularly to unmanned aerial system (UAS)-based systems for automated inventory control.

BACKGROUND

Freight is the bloodline of trade, and it is utterly important to our society. Typically, freight consists of individual containers that are transported using a combination of ships, aircraft, train, and trucks. During transportation, these containers may be stored in yards or intermodal storage facilities, which support storage and transportation of containers via different modes of transportation. These intermodal storage facilities are typically arranged in lots, each with multiple rows of containers, each row including several slots, and each slot able to accommodate a container. A location of a container in an intermodal storage facility may include a lot, a row, and a slot indicating where the container is located in the intermodal storage facility.

However, accurately maintaining inventory in intermodal storage facilities is very challenging. For example, determining the actual location of a container in an intermodal storage facility is difficult, as often containers are not in the location to which they are assigned, and current inventory control systems are not robust enough to handle discrepancies between assigned and actual locations of containers. For example, a first container may be assigned lot A, row 3, slot 28, but the users tasked with placing the first container in the appropriate location make a mistake and place the first container in lot A, row 3, slot 27. Because of this user error, an inventory control system may assign a second container to lot A, row 3, slot 27, as this location is mistakenly believed to be available, and current systems have no functionality of capability to identify and/or correct this discrepancy. Moreover, the problem is a compounding problem as when the users tasked with placing the second container in the appropriate location (lot A, row 3, slot 27), which is actually unavailable, may instead place the second container in a different location in order to avoid delays.

Some manual solutions implemented to deal with discrepancies between assigned and actual locations of containers may include a user manually verifying the location of every container in an intermodal storage facility to ensure that the actual location of each container matches the assigned location of each container. However, these manual solutions are extremely tedious and impractical given the number of containers stored in these intermodal storage facilities. Moreover, manual verification of the location of containers takes too much time and there would be a lag between when an error may occur and when the error is discovered, thereby failing to provide a robust solution to the problem of current inventory control systems.

SUMMARY

The present disclosure achieves technical advantages as systems, methods, and computer-readable storage media providing functionality for automated inventory control. The systems and techniques of embodiments provide improved inventory management systems with capabilities to, more accurately and with less lag time, automatically collect data associated with an intermodal storage facility and automatically perform analysis of the collected image data. The present disclosure provides for a system integrated into a practical application with meaningful limitations as, in some embodiments, the automated collection of the image data may leverage unmanned aerial system (UAS)-based automated data collection systems configured to capture image data associated with the intermodal storage facility using an image capturing device.

The present disclosure provides a technological solution missing from conventional systems as, in some embodiments, the automated analysis of the collected image data may include functionality to detect objects (e.g., containers, trailers, empty spaces or slots, and/or other objects) appearing in the image data (e.g., using a machine learning (ML) model), to identify the objects appearing in the image data (e.g., using the ML model), to inspect the identified objects (e.g., including determining a condition and/or location of the identified objects) based on the collected image data and metadata associated with the image capturing device (e.g., using an advance mathematical analysis), and/or to generate results that may be used by the inventory management system.

Accordingly, the present disclosure discloses concepts inextricably tied to computer technology such that the present disclosure provides the technological benefit of at least providing inventory control, such as in particular container identification and inspection (e.g., including determination of container location and/or condition), may be provided on demand and in near real-time (e.g., sub-second processing), which allows inventory management systems used to manage day to day operations to not only be efficiently integrated into an intermodal storage facility, but to provide a more accurate and fast representation of the inventory status and/or location of various objects in the intermodal storage facility than current manual solutions.

In one particular embodiment, an automated inventory control system is provided. The system comprises at least one processor, and a memory operably coupled to the at least one processor and storing processor-readable code that, when executed by the at least one processor, is configured to perform operations. The operations include obtaining a plurality of input images, detecting at least one object in at least one image of the plurality of input images, and correlating metadata associated with at least one frame to the at least one image of the plurality of input images. In embodiments, the at least one frame corresponds to the at least one image. The operations further include determining, based at least on the at least one image, an identification of the at least one object detected in the at least one image, determining, based at least in part on the metadata correlated to the at least one image, a location of the at least one object within a storage facility, and outputting one or more of the identification of the at least one object and the location of the at least one object.

In another embodiment, a method of automated inventory control is provided. The method includes obtaining a plurality of input images, detecting at least one object in at least one image of the plurality of input images, and correlating metadata associated with at least one frame to the at least one image of the plurality of input images. In embodiments, the at least one frame corresponds to the at least one image. The method further includes determining, based at least on the at least one image, an identification of the at least one object detected in the at least one image, determining, based at least in part on the metadata correlated to the at least one image, a location of the at least one object within a storage facility, and outputting one or more of the identification of the at least one object and the location of the at least one object.

In yet another embodiment, a computer-based tool for automated inventory control is provided. The computer-based tool may include non-transitory computer readable media having stored thereon computer code which, when executed by a processor, causes a computing device to perform operations. The operations include obtaining a plurality of input images, detecting at least one object in at least one image of the plurality of input images, and correlating metadata associated with at least one frame to the at least one image of the plurality of input images. In embodiments, the at least one frame corresponds to the at least one image. The operations further include determining, based at least on the at least one image, an identification of the at least one object detected in the at least one image, determining, based at least in part on the metadata correlated to the at least one image, a location of the at least one object within a storage facility, and outputting one or more of the identification of the at least one object and the location of the at least one object.

The foregoing has outlined rather broadly the features and technical advantages of the present disclosure in order that the detailed description that follows may be better understood. Additional features and advantages of the disclosure will be described hereinafter which form the subject of the claims in the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present description.

BRIEF DESCRIPTION OF THE DRAWINGS

For a more complete understanding of the present disclosure, reference is now made to the following descriptions taken in conjunction with the accompanying drawings, in which.

Figure 1:
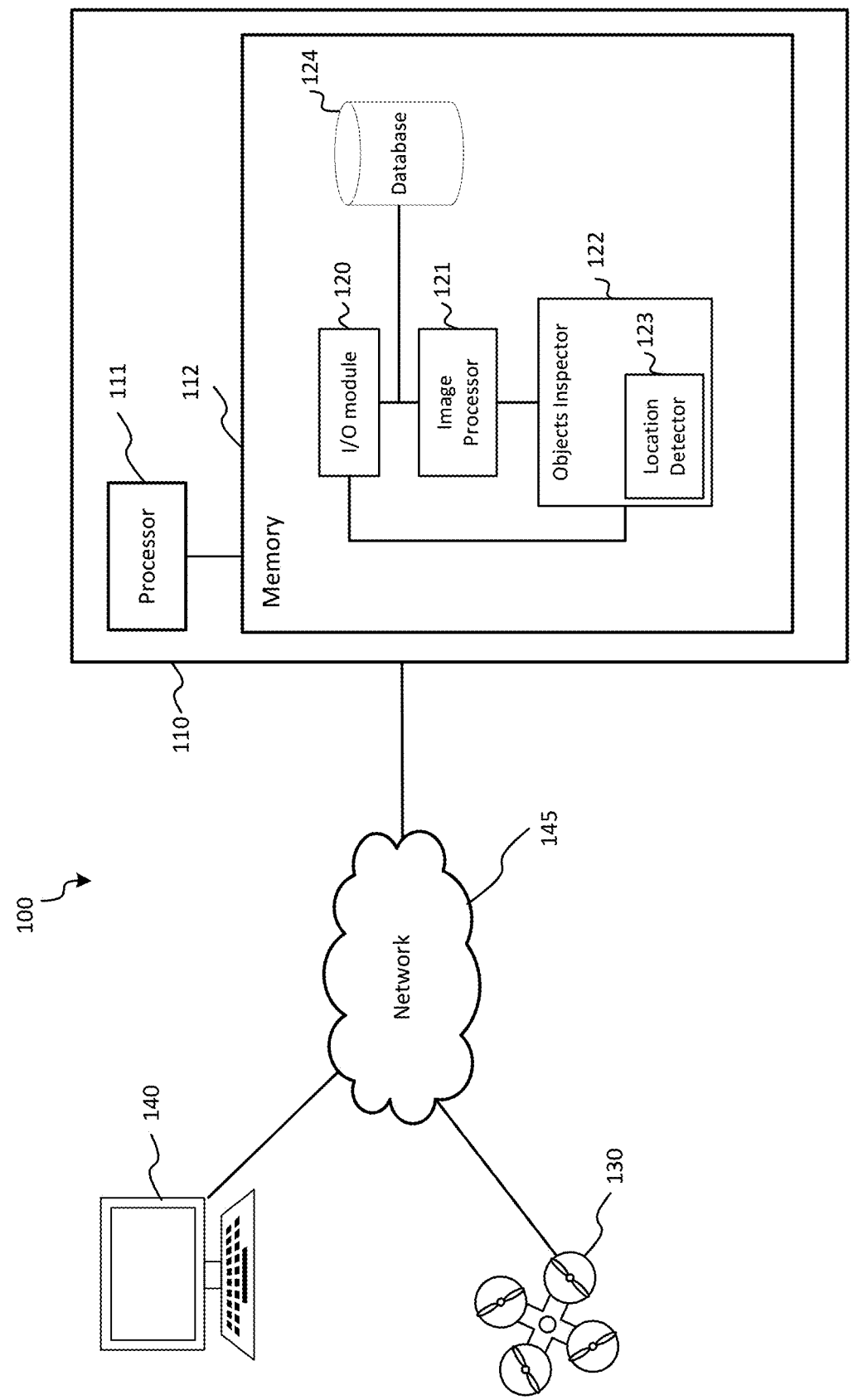
FIG. 1 is a block diagram of an exemplary system configured with capabilities and functionality for providing automated inventory control, in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the invention disclosed and claimed in the nonprovisional application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable rules and laws of this jurisdiction.

Various embodiments of the present disclosure are directed to systems and techniques that provide functionality for automated inventory control. The systems and techniques of embodiments provide improved inventory management systems with capabilities to, more accurately and with less lag time, automatically collect data associated with an intermodal storage facility and automatically perform analysis of the collected image data. In embodiments, the automated collection of the image data may leverage unmanned aerial system (UAS)-based automated data collection systems configured to capture image data associated with the intermodal storage facility using an image capturing device. In embodiments, the automated analysis of the collected image data may include functionality to detect objects (e.g., containers, trailers, empty spaces or slots, and/or other objects) appearing in the image data (e.g., using a machine learning (ML) model), to identify the objects appearing in the image data (e.g., using the ML model), to inspect the identified objects (e.g., including determining a condition and/or location of the identified objects) based on the collected image data and metadata associated with the image capturing device (e.g., using an advance mathematical analysis), and/or to generate results that may be used by the inventory management system. One of several benefits of the technological improvements provided by features of the disclosed systems and methods is that inventory control, such as in particular container identification and inspection (e.g., including determination of container location and/or condition), may be provided on demand and in near real time, which allows inventory management systems used to manage day to day operations to not only be efficiently integrated into an intermodal storage facility, but to provide a more accurate and fast representation of the inventory status and/or location of various objects in the intermodal storage facility than current manual solutions.

In some embodiments, the application of inventory control can involve objects (e.g., containers, trailers, empty spaces or slots, and/or other objects) in an intermodal storage facility. However, it should be appreciated that the techniques disclosed herein may also be applicable to other applications of inventory control and/or management. For example, the techniques disclosed herein may also be applicable in warehouses to manage retail inventory or may be applicable to manage inventory of vehicles in a vehicle lot. As such, the discussion herein with respect to containers in an intermodal storage facility should not be construed as limiting in any way.

FIG. 1 is a block diagram of an exemplary system 100 configured with capabilities and functionality for providing automated inventory control in accordance with embodiments of the present disclosure. As shown in FIG. 1, system 100 may include server 110, user terminal 140, capturing device 130, and network 145. These components, and their individual components, may cooperatively operate to provide functionality in accordance with the discussion herein. For example, in operation according to embodiments, user terminal 140 may facilitate a user interacting with system 100, e.g., via network 145, to initiate an operational workflow to automatically collect image data, identify objects (e.g., containers, trailers, empty spaces or slots, and/or other objects), inspect objects, determine locations of objects, and/or verify or confirm expected locations of objects in an intermodal storage facility. The operational workflow may be initiated by the user scheduling and/or executing a flight plan (e.g., specifying one or more parameters that capturing device 130 may use for capturing image data) that may include a flight route (e.g., including a pattern and/or range) to be followed by capturing device 130, or may be previously scheduled to be executed at a particular date/time or at a particular periodic interval. Upon execution of the flight plan, capturing device 130 may follow the flight route while capturing image data of the intermodal storage facility in accordance with the one or more parameters. The image data may include image data of the objects in the intermodal storage facility. The captured image data may be uploaded or fed, e.g., via network 145, to server 110 for processing. In embodiments, the image data may include one or more videos of the objects. The various components of server 110 may cooperatively operate to split the one or more videos into individual frames, to correlate metadata of capturing device 130 to the individual frames, and to identify frames including at least one object (e.g., using an ML model). As used herein, a frame including at least one object may refer to a frame in which at least one object (e.g., a container, a trailer, an empty space or slot, and/or another object) appears. Identifying frames including at least one object may also be referred to as detecting at least one object in a frame. The various components of server 110 may cooperatively operate to process (e.g., using the ML model) the frames including at least one object to identify the at least one object detected in the frames. For example, the type of object may be determined, such as a container, a trailer, an empty space or slot, another object, etc. In embodiments, where the object includes at least one container, the identification (ID) of the at least one container may be determined. The various components of server 110 may cooperatively operate to inspect the at least one object appearing in the frames. In embodiments, inspecting the at least one object may include determining (e.g., using advanced mathematical analysis) a location of the at least one object in the intermodal storage facility based, at least in part, on the image data and the metadata correlated to frames in which the at least one object appears. In embodiments, a location of the at least one object may refer to global positioning system (GPS) coordinates, geographic information system (GIS) coordinates (e.g., GIS coordinates that may include a lot indicator, a row indicator, and/or a slot indicator), and/or any other measure of physical location. In some embodiments, inspecting the at least one object may include determining a condition of the at least one object based on based, at least in part, on the image data of the frames in which the at least one object appears. In embodiments, a condition of the at least one object may refer to physical condition of the at least one object and may include any damage to the object, whether the container is open or closed when the object is a container, whether the object is positioned correctly, whether a slot is empty when the object is a slot, etc. In some embodiments, the various components of server 110 may cooperatively operate to generate and output results that may include the identification, location, and/or condition of the at least one object. In embodiments, the results may be outputted to user terminal 140 for presentation to a user or may be output to an external system.

It is noted that, in some embodiments, a central controller manages the operation workflow described herein. The central controller may operate to manage a queue service that may include messages between the different components of server 110. In these embodiments, functionality of the various components of server 110 may be controlled via the queue messages, which may be configured to carry information and data between the various components, as well as cause the various component to perform operations in accordance with the functionality described herein.

Figure 2:
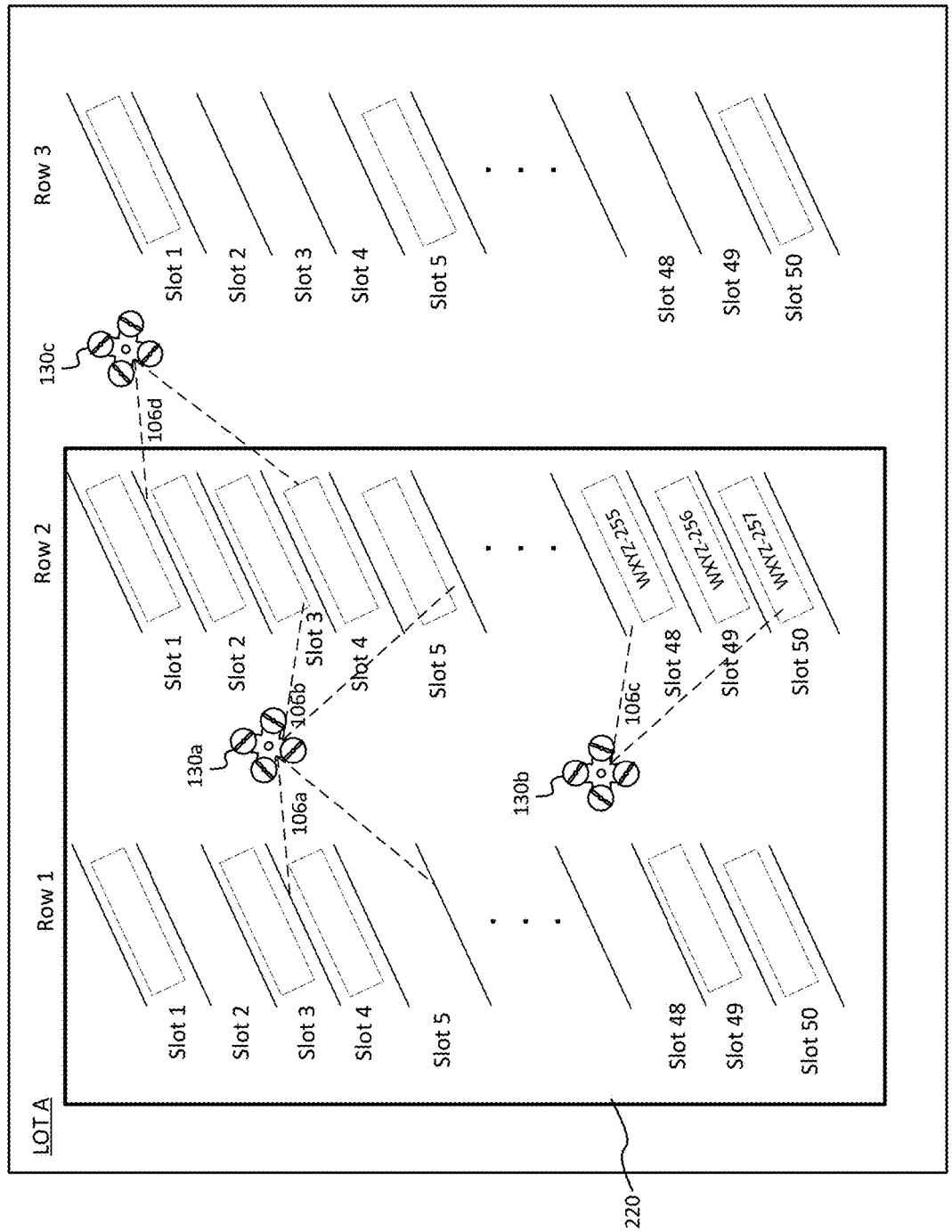
FIG. 2 is a block diagram illustrating an example of operations of a system for automated inventory control implemented, in accordance with embodiments of the present disclosure.

What follows is a more detailed discussion of the functional blocks of system 100 shown in FIG. 1. The discussion of system 100 will be further based on the example illustrated in FIG. 2. FIG. 2 is a block diagram illustrating an example of operations of a system for automated inventory control implemented in accordance with embodiments of the present disclosure. It is noted that the functional blocks, and components thereof, of system 100 of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 140.

User terminal 140 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 140 may be configured to provide a GUI structured to facilitate a user interacting with system 100, e.g., via network 140, to execute and leverage the features provided by server 110, and may allow the user to initiate an operational workflow that includes automated collection of image data and automated analysis of the image data. In embodiments, the automated image data collection may include executing a flight plan that is followed by capturing device 130 to capture the image data associated with the intermodal storage facility. The automated analysis of the image data may include identifying objects (e.g., containers, trailers, empty slots, and/or other objects) in the image data, inspecting objects based on the image data, determining locations of objects, and/or verifying or confirming expected locations of objects in the intermodal storage facility. For example, in some embodiments, a user may specify one or more parameters for an automated flight plan that may include a flight route (e.g., including a pattern, range, etc.) to be followed by capturing device 130 within the intermodal storage facility to capture image data of the objects stored in the intermodal storage facility. In some embodiments, the user may manually specify the flight route that capturing device 130 may follow during the automated flight. In some embodiments, the user may specify an area to be inspected (e.g., by drawing or placing a box, such as box 220 shown in FIG. 2, of a particular size and/or shape around the area to be inspected, or by specifying a location (e.g., lot A, rows 1 and 2) to be inspected), and the system may automatically determine a flight route (e.g., may determine an optimized automated flight route) to be followed by capturing device 130 based on the one or more parameters specified by the user. The one or more parameters may include a flight altitude at which capturing device 130 is to fly when capturing the image data, a flight speed indicating the speed at which capturing device 130 is to fly when capturing the image data, a capture quality indicating the quality of at which capturing device 130 is to capture the image data, a focal point altitude indicating an altitude at which the capturing device is to focus to capture the image data, a type of image data to be collected, a format of the image data to be collected, etc. In this, manner, a user may specify an automated data collection as part of the operational workflow, which may be performed automatically (e.g., without a traditional pilot or observer) and which may be repeatable, as the automated flight plan may be stored for later execution or may be scheduled to be executed at periodic intervals.

In embodiments, user terminal 140 may allow the user to execute the flight plan by activating a control element of the GIU provided by user terminal 140. In alternate or additional embodiments, the flight plan may have been previously scheduled to be executed at a particular date/time or at a particular periodic interval, and in this case the flight plan may be executed automatically without user activation. As will be explained in further detail below, upon execution of the flight plan, capturing device 130 may follow the flight route while capturing image data in accordance with the one or more parameters.

In some embodiments, user terminal 140 may be configured to present (e.g., display) the results output by server 110, which may include the identification, location, and/or condition of objects detected in the image data captured by capturing device 130. In some embodiments, the results be output to external system, such as an inventory management system that manages and tracks inventory for the intermodal storage facility.

Capturing device 130 may be configured to capture image data of the objects in the intermodal storage facility. For example, in embodiments, capturing device 130 may be or may include an image capturing device (e.g., a camera) configured to capture or take still pictures or video. In some embodiments, capturing device 130 may be a vehicle upon which the camera may be mounted. For example, the vehicle may be a ground vehicle (e.g., a car or truck), or may be an aerial vehicle (e.g., a piloted aerial vehicle, such as an onboard or remote-piloted aerial vehicle, or a UAS). Capturing device 130 may be configured to avoid obstacles, and/or may be configured to traverse the intermodal storage facility at low speeds (e.g., speeds not exceeding ten miles per hour), or at speeds that may exceed ten miles per hour.

It is noted that although the present discussion focuses on a UAS as the capturing device (e.g., a UAS with a camera mounted on the UAS), the techniques disclosed herein are also applicable where the capturing device includes a manned aerial system, or a ground vehicle. For example, in some embodiments, a ground vehicle may have a camera mounted on it, and the camera may be configured to capture image data of the objects as the vehicle is driven (e.g., following a "flight" plan, which may set out the ground rout to be followed by the ground vehicle) through the intermodal storage facility in accordance with the flight plan. As such, the discussion of a UAS should not be construed as limiting in any way.

It is further noted that as used herein, a UAS may refer to an unmanned aerial vehicle, and may include an autonomous or ground controlled aircraft such as a drone, a multi-copter, a quadcopter, fixed wing aircraft, etc.

Capturing device 130 may be configured to traverse the intermodal storage facility following the flight route (e.g., speed, altitude of the image capturing device, capture quality, etc.) while capturing the image data that includes objects (e.g., containers, trailers, empty slots, and/or other objects) in the intermodal storage facility. For example, as shown in FIG. 2, capturing device 130 may include capturing device 130a, and capturing device 130a may be configured to traverse the intermodal storage facility where lot A is located to capture image data in accordance with the flight plan, which may include capturing image data for lot A, rows 1 and 2.

As noted above, capturing device 130 may be configured such that a capture angle (e.g., tilt angle) of the image capturing device (e.g., the camera mounted on capturing device 130) points the camera at the intermodal storage facility, including the objects, to capture images or video of the objects as capturing device 130 follows the flight route in accordance with the flight plan. For example, in embodiments where the objects include containers (such as in the example illustrate in FIG. 2), capturing device 130 may be configured to fly over the intermodal facility (or in some cases over an area outside of and adjacent to the intermodal storage facility, such as capturing device 130c) following at a path that is offset to the containers in the intermodal storage facility such that the image capturing device of capturing device 130 may have a line of sight to one side-end of the containers (e.g., an end containing an identification of the container), which may not be the top side of the container. For example, as shown in FIG. 2, capturing device 130a may fly along a path that is offset to rows 1 and 2, in order to have a line of sight to the end-sides of the containers stored in rows 1 and 2. In this manner, the image data captured may include images or videos of the containers including a side-end of the containers that may include the ID of the containers.

In embodiments, the image data captured by capturing device 130 may include metadata associated with capturing device 130 recorded by capturing device 130 as capturing device 130 traverses the intermodal storage facility. For example, at periodic intervals, capturing device 130 may record or sample metadata that may include a location of capturing device 130, an orientation of capturing device 130 (e.g., an orientation of a UAS and/or an orientation of a gimbal upon which the image capturing device, such as a camera, is mounted), an altitude of the capturing device, a speed of the capturing device, a timestamp, etc., of capturing device 130 at the moment the metadata is recorded. The sampling rate of the metadata, e.g., the intervals at which the metadata may be recorded may be frequent, e.g., between 5-15 Herts (Hz), a sampling rate equal to the frames per second rate of the image data captured, etc. In another embodiment, the metadata sampling rate can range between 10 Hz and 60 Hz. In another embodiment, the sampling rate can be dependent on the camera's rate combined with the GPS's sampling rate. For example, a sampling rate of 10 Hz can provide sufficient accuracy and speed given particular hardware. In some embodiments, metadata may be part of frame-level records for a video or may be scaled or interpolated to simulate a frame-level records. For still images, metadata may be obtained or retrieved from internal file information of the image.

In embodiments, capturing device 130 may include onboard memory (not shown) configured for storing the captured image data, including the image data associated with the intermodal storage facility and the metadata associated with capturing device 130. In these embodiments, the captured image data may be stored on the onboard memory for subsequent offloading (e.g., to server 110 via network 145). In some embodiments, capturing device 130 may be configured to live-stream (e.g., via network 145 or another network not shown) the captured image data to server 110. In these embodiments, capturing device 130 may transmit, send, or upload the image data in real-time, or near-real-time, to server 110 as the image data is being captured. The live-stream functionality of capturing device 130 may be in addition or in the alternative to storing the captured image data on the onboard memory of the capturing device 130 for subsequent offloading to sever 110.

In some embodiments, system 100 may include more than one capturing device 130. For example, as show in FIG. 2, system 100 may include capturing devices 130a-130c. In these embodiments, a swarm of capturing devices (e.g., a plurality of capturing devices) may be used to capture the image data of the objects in the intermodal storage facility. In some embodiments, each of the plurality of capturing devices may operate individually and may collect and upload image data of the objects for processing by server 110. For example, each of the plurality of capturing devices may be assigned to a different area of the intermodal storage facility, and each of the plurality of capturing devices may be used to identify and inspect different objects (e.g., different objects in different areas) in the intermodal storage facility. In some embodiments, the plurality of capturing devices may operate in redundancy mode, and in this case, some capturing devices of the plurality of capturing devices may be used to double-check results associated with other capturing devices. For example, capturing devices 130a, 130b, and 130c may be assigned to the area enclosed by box 220 of the intermodal storage facility. In this manner, capturing devices 130a, 130b, and 130c may operate to capture image data of the same objects, namely the objects in rows 1 and 2. The results associated with the image data captured by one capturing device may be used to verify, confirm, or otherwise validate the results associated with the image data captured by another capturing device, as the results should be similar. In some embodiments, the redundancy mode may include assigning some capturing devices to be on stand-by to replace other capturing devices when problems occur. For example, capturing device 130c may be assigned to be on stand-by. In this case, if a problem occurs with either capturing device 130a or 130b (e.g., one of the capturing devices breaks down, runs out of battery, is damaged, or cannot otherwise operate), capturing device 130c may be launched into operation to replace the capturing device having the problem, thereby ensuring continuity of operations.

In some embodiments, a capturing device may be configured to capture image data from more than one row concurrently. For example, capturing device 130a may be configured to capture image data from row 1 and row 2, concurrently.

In embodiments, server 110, capturing device 130, and user terminal 140 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Server 110 may be configured to perform automated analysis of the image data collected as part of the operation workflow. In embodiments, the automated analysis of the image data may include ingesting the image data, detecting objects appearing in the image data, identifying the objects based on the image data, inspecting the objects based on the image data, and generating an output including results of the automated analysis, in accordance with embodiments of the present disclosure. This functionality of server 110 may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 124, I/O module 120, image processor 121, and objects inspector 122. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 124 for storing various information related to operations of system 100. For example, database 124 may store ML models, mathematical models, rules models, and/or other models that may be used by components of server 110 to analyze and process image data to detect objects appearing in the image data, to identify the objects based on the image data, and to inspect the objects based on the image data in accordance with embodiments of the present disclosure. In embodiments, database 124 may provide storage of the image data collected by capturing device 130, including the image data associated with the intermodal storage facility and the metadata associated with capturing device 130. For example, the image data collected or captured by capturing device 130 may be ingested by server 110 (e.g., via I/O module 120) and may be stored in database 124 for further analysis (e.g., analysis by image processor 121 and objects inspector 122). In embodiments, database 124 may provide storage configuration data, such as configuration of automated flight plans for data collection, (e.g., periodicity of flight plan execution, the one or more parameters, including flight route, flight pattern, flight range, flight altitude, flight speed, video capturing speed, focal point altitude, capture video quality, type of image data to be collected, etc.), which may be used during the automated data collection phase of the operational workflow described herein. Database 124 is illustrated as integrated into memory 112, but in some embodiments, database 124 may be provided as a separate storage module or may be provided as a cloud-based storage module. Additionally, or alternatively, database 124 may be a single database, or may be a distributed database implemented over a plurality of database modules.

I/O module 120 may be configured to perform input and/or output operations for server 110 as part of the operational workflow described herein and performed in accordance with the present disclosure. In embodiments, input functionality of I/O module 120 may include an automated data ingestion module configured to automatically ingest, retrieve, collect, download, or otherwise receive the image data collected by capturing device 130, including the image data associated with the intermodal storage facility and the metadata associated with capturing device 130. As described above, the image data captured by capturing device 130 may be stored on onboard memory of capturing device 130 for subsequent retrieval, in which case the image data is not provided to server 110 until after capturing device 130 has finished the flight to automatically collect the image data, or the image data captured by capturing device 130 may be live-streamed from capturing device 130 directly to server 110 during the automatic flight of capturing device 130 capture the image data, such as near-real time. In these embodiments, I/O module 120 may establish a connection with capturing device 130 (e.g., via network 145 or another communication network), and may ingest the image data from capturing device 130, either by retrieving the image data from the onboard memory of capturing device 130 or by receiving a live stream of the image data from capturing device 130. In some embodiments, the image data may be captured at 30, 60, or even 120 frames per second (fps). In embodiments, a high fps rate is preferable, as the inventors have found that an fps of less than 10 fps is inadequate for operations.

In some embodiments, I/O module 120 may store the image data received from capturing device 130 on database 124, or may provide the image data directly to image processor 121. In embodiments, operations of I/O module 120 to ingest the image data from capturing device 130 may be performed automatically, without manual intervention from a user, or may be initiated manually by a user.

In embodiments, output functionality of I/O module 120 may include generation and outputting of results that may include an identification, a location, and/or a condition of at least one object as determined by the cooperative operation of various components of server 110. In embodiments, I/O module 120 may be configured to provide the results to user terminal 140 for presentation to a user (e.g., via a GUI displayed on user terminal 140). In additional or alternative embodiments, I/O module 120 may be configured to provide the results to an external inventory management system. For example, the results may be provided an existing inventory management system and, in this manner, system 100 may be integrated into existing inventory management systems. In some embodiments, the results may be output to another internal system, which may enable a mechanism for expanding the features of system 100, such as by leveraging the results of the automated operations workflow to new capabilities.

In some embodiments, I/O module 120 may include functionality to convert the location of objects detected and identified based on the image data from a first type of coordinate system to a second type of coordinate system. For example, the location of objects may be determined by location detector 123 and may be provided as GPS coordinates. In this case, I/O module may be configured to convert the GPS coordinates provided by location detector 123 to a different coordinate system. The different coordinate system may include a geographic information system (GIS) coordinate system in which a location of an object in the intermodal storage facility may be expressed as GIS coordinates including a lot indicator, a row indicator, and/or a slot indicator. In this case, the GIS coordinate system may be with respect to the intermodal storage facility in which system 100 may be operating, as the GIS coordinates may refer to a lot, row, and/or slot within the intermodal storage facility. It is noted that, in some embodiments, the functionality to convert the location of an object from a first type of coordinate system to a second type of coordinate system may be implemented in a different component of sever 110 (e.g., in location detector 123), in which case I/O module 120 may not perform the conversion or may additionally perform the conversion (e.g., to confirm the conversion by the other component).

In some embodiments, converting GPS coordinates of an object to a GIS coordinate system may include relating the GPS coordinates to a GIS dataset associated with the intermodal storage facility, where the GIS data set associates GIS coordinates (e.g., defined by a lot indicator, a row indicator, and a slot indicator) to GPS coordinates. In this manner, a location of an object given as GPS coordinates may be related to GIS coordinates. For example, in embodiments, a GIS asset polygon shapefile may be loaded into a dataframe, and a determination may be made as to whether the location of the object is intersected by an asset polygon of the dataframe. Based on a determination that the location of the object is intersected by an asset polygon of the dataframe, the asset information is associated with the object and the GIS coordinates of the asset is associated with the object. Based on a determination that the location of the object is not intersected by an asset polygon of the dataframe, the closest asset to the location of the object, within a maximum distance from the object, is determined and information of the closest asset is associated with the object, such that the GIS coordinates of the closest asset is associated with the object Image processor 121 may be configured to analyze the image data to detect and identify objects appearing in the image data. For example, the image data received from capturing device 130 may include image data associated with the intermodal storage facility and metadata associated with capturing device 130. In embodiments, the image data associated with the intermodal storage facility may be analyzed frame by frame using an ML and computer vision (CV) model. The ML/CV model may be trained to detect and identify objects, such as containers, trailers, empty slots, and/or other objects, appearing in image data.

In embodiments, the analysis of the image data by image processor 121 may include splitting or breaking out the image data associated with the intermodal storage facility into individual frames. As noted above, the image data may be captured by capturing device 130 using one of different fps rates. As such, the image data may represent a set of frames in sequence, where the number of frames in the set of frames may depend on the fps rates at which the image data was captured. Splitting the image data into individual frames may result in a plurality of images, where each image in the plurality of images corresponds to one frame of the set of frames. Each image of the plurality of images may include a view of the intermodal storage facility as seen by capturing device 130 at the moment the corresponding frame was captured.

In embodiments, image processor 121 may be configured to apply the trained ML/CV model to each image of the plurality of images to detect objects appearing in the images of the plurality of images. For example, the trained ML/CV model may determine a set of images in which at least one object appears. In some cases, more than one object may appear in a single image. In some embodiments, the trained ML/CV model may draw a bounding box around each detected object in an image. For example, the trained ML/CV model may detect at least one object in a first image. In this case, the trained ML/CV model may draw a bounding box around each of the at least one object detected in the first image. Similarly, the trained ML/CV model may detect at least one object in a second image. In this case, the trained ML/CV model may draw a bounding box around each of the at least one object detected in the second image. As will be appreciated, drawing a bounding box a detected object may allow further processing to be focused on the relevant object detection, which may result in faster processing. In this example, the first and second image may be included in the set of images in which an object appears.

In some embodiments, the trained ML/CV model may also be configured to detect text that is part of a detected object. For example, the trained ML/CV model may be configured to detect text that is part of each of the at least one object detected in the first image (e.g., an ID printed on each of the at least one object). In this case, the trained ML/CV model may draw a text bounding box around the detected text. In some embodiments, the trained ML/CV model may be configured to distinguish between numbers and letters, and in these embodiments, the text bounding box may include a first bounding box disposed around the letters, and a second bounding box disposed around the numbers. In embodiments, the first and second bounding boxes may be different (e.g., may be of a different color, shape, or line type). As noted above, the bounding boxes may facilitate further processing by focusing the further processing on the relevant portions of the image.

Figure 3:
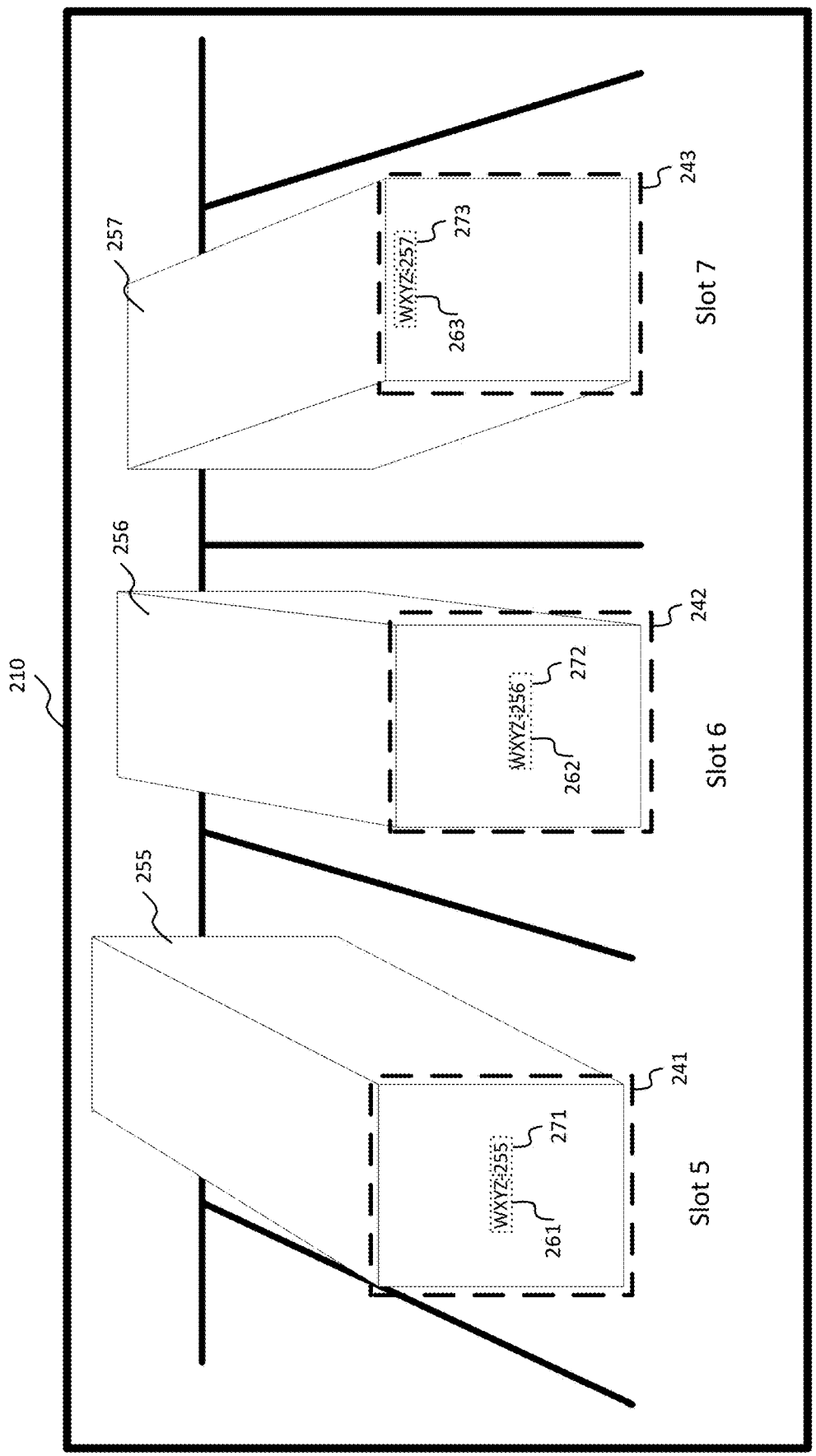
FIG. 3 illustrates an example of an object detection, in accordance with embodiments of the present disclosure.

FIG. 3 illustrates an example of an object detection in accordance with embodiments of the present disclosure. As can be seen, three containers 255-257 may be detected in image 210. In this case, the trained ML/CV model may draw a bounding box around each of the detected containers, with bounding box 241 drawn around container 255, bounding box 242 drawn around container 256, and bounding box 243 drawn around container 257. As also seen, the trained ML/CV model may detect text, including letters and numbers representing the container ID, on each of the three containers 255-257, and may draw a text bounding box around the detected text. In this case, bounding box 261 may be drawn around the letters of the text detected on container 255 and bounding box 271 may be drawn around the numbers of the text detected on container 255. The trained ML/CV model may also draw bounding box 262 around the letters of the text detected on container 256 and bounding box 272 around the numbers of the text detected on container 256, and may draw bounding box 263 around the letters of the text detected on container 257 and bounding box 273 around the numbers of the text detected on container 257.

With reference back to FIG. 1, in some embodiments, the trained ML/CV model may be configured to provide a confidence value associated with an object detection. The confidence value of an object detection may include an indication of a likelihood that the detection of the object is correct. The set of images in which at least one object is detected, and the associated confidence value, may be stored in database 124.

In alternative embodiments, images may be arranged in sets corresponding to a detected object. For example, the trained ML/CV model may detect a first object in a first set of images of the plurality of images. The trained ML/CV model may also detect a second object in a second set of images of the plurality of images. In some cases of these embodiments, the first set of images may include more than one image in which the first object appears. In some other cases, the first set of images may only include a single image in which the first object appears (e.g., the trained ML/CV model may have identified only a single image in which the first object appears). In some cases, more than one object may appear in a single image. For example, the first object and the second object may appear in the same image. In this case, the same image (e.g., the at least one image in which both the first object and the second object appear) may be included in the first set of images and the second set of images.

In embodiments, image processor 121 may be configured to apply the trained ML/CV model to the images in the set of images in which at least one object is detected to identify the at least one object detected in each of the images in the set of images. For example, the trained ML/CV model may be applied to one or more images in the set of images in which at least one object is detected to identify the at least one object appearing in the images. In some embodiments, the ML/CV model may be configured to identity the type of objects (e.g., a container, a trailer, an empty slot, etc.) appearing in each image of the set of images. For example, the ML/CV model may be configured to analyze the at least one object appearing in the bounding box in the images of the set of images to determine that whether the at least one object is a container, a trailer, an empty slot, etc. In cases where more than one object is detected in an image, the ML/CV model may be configured to identify the type of object for each object detected in the image.

In additional or alternate embodiments, the ML/CV model may be configured to analyze text appearing in text bounding boxes in the images of the set of images to determine an ID of an object on which the text appears. For example, the ML/CV model may be configured to determine the ID of an object appearing in a first image of the set of images by analyzing the detected text on the object.

In embodiments, image processor 121 may be configured to correlate metadata associated with capturing device 130 to each image in the set of images in which at least one object is detected. For example, as noted above, metadata associated with capturing device 130 may be received with the image data from capturing device 130. The metadata may be recorded at a particular sampling rate, and each frame corresponding to each image of the set of images may be correlated with particular metadata. In embodiments, correlating metadata to a frame may include determining a set of metadata that corresponds to metadata that was sampled at the time the frame was captured. The set of metadata that corresponds to metadata that was sampled at the time the frame was captured may be determined by calculating a timestamp of the frame (e.g., based on the beginning of the image data capture and the location of the frame within the sequence of frames of the image data) and determining the metadata that was sampled by capturing device 130 at the time timestamp of the frame. In this manner, metadata is correlated (or assigned) to the frame, and an image corresponding to the frame is correlated to the metadata. As noted above, the metadata may include a location of the capturing device 130 at the of capture, an orientation of the capturing device 130 (e.g., an orientation of the image capturing device, such as a camera, of capturing device 130), an altitude of capturing device 130, a speed of capturing device 130, etc. In this manner, each image of the set of images in which at least one object is detected may be correlated with metadata.

In some embodiments, the set of images in which at least one object is detected, including bounding boxes around each object and text detected in each image, the identification and/or ID of each object detected in each image, and the metadata correlated to each respective image in the set of images may be stored in database 124.

Objects inspector 122 may be configured to inspect each object detected in each image of the set of images, where inspecting an object may include determining a condition and/or location of the object. In embodiments, determining a condition of each object detected in each image of the set of images may include applying a trained ML model to each image to detect a condition of each object detected in each image. The trained ML model may be configured to analyze an image including a bounding box around at least one detected object, and may determine one or more of a physical condition of the at least one detected object, including any damage to the at least one detected object, whether the at least one detected object is open or closed, whether the at least one detected object is positioned correctly, whether the at least one detected object is empty (e.g., when the at least one detected object is a slot), etc.

In embodiments, determining a location of objects detected in images of the set of images may include application of an advance mathematical rule set implemented by location detector 123. Location detector 123 may be configured to apply the rule set to determine a location of objects detected in the images of the set of images in which at least one object is detected. In embodiments, the rule to determine the location of objects includes obtaining the set of images in which at least one object is detected along with the metadata assigned (or correlated) to each of the images in the set of images and the confidence value of each object detection. It is noted that each image in the set of images may include one or more detected objects, and in some cases may include a plurality of detected objects. In some cases, a same object may appear in more than one image of the set of images. For example, a first image of the set of images may include a detection of a first object, and a second image of the set of images may also include a detection of the first object. In some embodiments, it is expected that a same object is detected in a significant number of images in the set of images. In some cases, a higher number of detections of a same object (e.g., detection of the same object in a high number of images in the set of images) is desirable as this condition may increase the likelihood of accurately determining the location of the detected object.

In embodiments, location detector 123 may process the data set and remove any object detections with a confidence value below a confidence threshold. In this case, a detection of an object in a first image where the detection of the object has a confidence value below the confidence threshold may not be further considered by location detector 123 for determining a location of the object. It is noted that the object may have also been detected in other images, with a higher confidence value. In this case, if the higher confidence of the other detections is not below the confidence threshold, these further detections may be considered by location detector 123 for determining a location of the object. For example, a detection of the object in a second image may have a confidence value that is not below the confidence threshold. In this case, the detection of the object in the second image may be further considered by location detector 123 for determining a location of the object.

In embodiments, having removed any object detections with a confidence value below the confidence threshold from the data set, location detector 123 may identify unique objects from the detected objects. Location detector 123 may iterate through the images in the set of images in which at least one object is detected in the order in which the images were captured (e.g., in the order in which the associated frames where captured). For example, location detector 123 may compare the timestamp associated with each image and may iterate through the images from earlier to later, tracking any objects detected in the images from image to image. For example, location detector 123 may compare the location of each object in an image from image to image to track the location of each object through the iteration of the images. At each image, location detector 123 may determine whether new objects are present in the image and may assign a unique ID to new objects. For example, at a current image (e.g., a current iteration through the images), location detector 123 may determine that a first object detected in the current image is a new object (e.g., the first object has not been seen by location detector 123 in an earlier image). In this case, location detector 123 may assign a unique ID to the first object. In some embodiments, location detector 123 may also include the current image including the first object in a unique ID set of images corresponding to the ID of the first object. In some embodiments, an observations counter associated with the unique ID of the first object may be incremented by one. In addition, or in the alternative, location detector 123 may determine any detected objects in the image that are not new objects (e.g., objects previously seen by location detector 123 in at least one earlier image). For each of these previously seen objects, location detector 123 may include the current image in a unique ID set of images corresponding to each respective ID of the previously seen objects.

Following the example above, at a next image (e.g., a next iteration through the images), location detector 123 may determine that the first object was also detected in the next image. In this case, location detector 123 may include the next image including the first object in the unique ID set of images corresponding to the ID of the first object and may increment the observations counter associated with the unique ID of the first object by one. In this manner, the unique ID set of images corresponding to the ID of the first object may include a number of images corresponding to the number of observations of the first object in the set of images. The observations counter associated with the unique ID may also correspond to the number of observations of the first object in the set of images. Location detector 123 may perform similar operations for each object detected in the set of images.

In embodiments, after iterating through all the images in the set of images in which at least one object is detected, location detector 123 may discard unique ID sets of images corresponding to IDs of objects with an observations counter lower than a predetermined threshold. In these embodiments, any object that is not observed in at least a number of images equal to the predetermined threshold is not further considered by location detector 123 for location determination. However, any object that is observed in at least a number of images equal to the predetermined threshold is further considered by location detector 123 for location determination.

In embodiments, after discarding unique ID sets of images corresponding to IDs of objects with an observations counter lower than a predetermined threshold, the data set includes unique ID sets of images corresponding to unique objects with unique IDs. Location detector 123 may be configured to determine, for each unique ID set of images, any object detections in which the bounding box around the detected object has an aspect ratio that is not proper for the type of object detected. In embodiments, location detector 123 may be discard object detections in which the bounding box around the detected object has an aspect ratio that is not proper for the type of object detected and may not considered these object detections for further processing. However, location detector 123 may consider for further processing object detections in which the bounding box around the detected object has an aspect ratio that is proper for the type of object detected. For example, a detection of a container at the edge of a first image, which may show only a portion of the container, may be bounded by a bounding box with an aspect ratio that does not include the portion of the container not shown in the first image, and thus, may not be a proper aspect ratio for the container. In this case, the detection of the container in the first image may not be further considered by location detector 123 for determining the location of the container.

Figure 5:
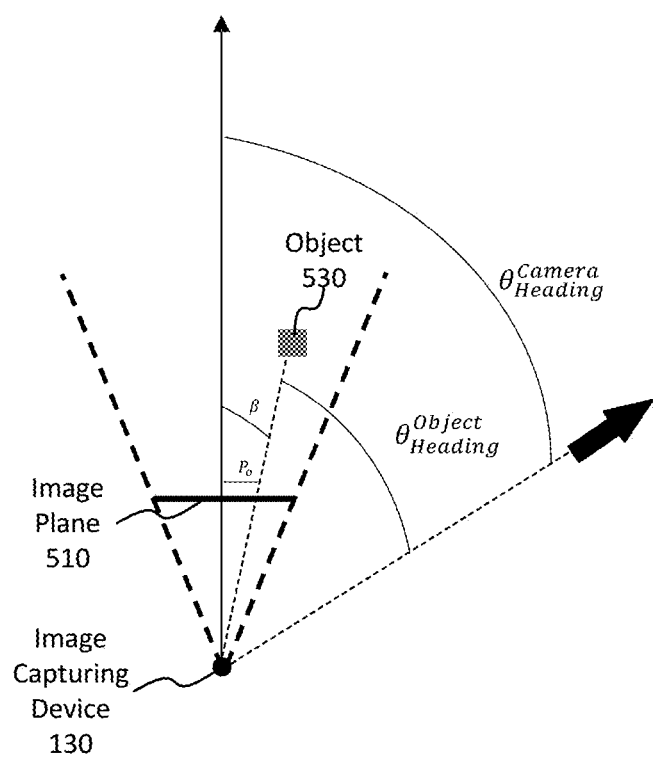
FIG. 5 illustrates an example algorithm for determining a heading of an observation of an object in an image in accordance with embodiments of the present disclosure.

In embodiments, after discarding object detections with bounding boxes having an improper aspect ratio from each unique ID set of images, location detector 123 may determine a heading for each object detected in each image of each unique ID set of images. For example, location detector 123 may be configured to calculate a heading of an observation (e.g., a detection) of an object in an image (e.g., a unique object detected in each image of a unique ID set of images associated with the unique object) based on a yaw heading of the image, a field of view of the image capturing device that captured the image, and an X pixel value of a midpoint of the bounding box around the detected object. For example, location detector 123 may be configured to calculate a heading of an observation of an object in an image based on a process or algorithm as illustrated in FIG. 5. FIG. 5 illustrates an example algorithm for determining a heading of an observation of an object in an image in accordance with embodiments of the present disclosure. In embodiments, determining a heading of an observation of an object (object heading θ) may include determining a horizontal pixel location $P_o$ of the center of object 530 detected in the image from the center of the image. Once the horizontal pixel location $P_o$ is found, a relative angle β is determined, relative angle β being a relative angle to object 530. In embodiments, relative angle β may be determined based on equation 1.

$$\beta = \frac{P_o}{W} \times \theta_{FOV}, \qquad \text{(Equation 1)}$$

where $\theta_{FOV}$ represents the field of view of image capturing device 130 as an angle and W represent the width of the image in which object 530 is detected in pixels.

In embodiments, the object heading θ may be determined based on the heading of image capturing device 130 (camera heading θ) and relative angle β. For example, the object heading θ may be determined based on equation 2.

$$\theta_{Heading}^{Object} = \theta_{Heading}^{Camera} - \beta \qquad \text{(Equation 2)}$$

In embodiments, the yaw of the observation of the object may be determined based on the yaw component of the heading of image capturing device 130. For example, the yaw component of object heading θ may be assumed to be equal to the yaw component of camera heading θ.

In embodiments, location detector 123 may be configured to generate, for each object detected in each image of each unique ID set of images, a line that is based on the calculated observation heading for each object and a location of the image capturing device at the time the image was captured. In embodiments, the line for an object detected in an image (e.g., detected by the capturing device) represents a line running from the location of the capturing device at the time the image was captured to the detected object (e.g., the center of the bounding box) in the image. For example, for a first object detected in a first image of a first unique ID set of images, metadata correlated to the first image may include a location of the image capturing device at the time the first image was captured. In some embodiments, the location may be in the form of GPS coordinates. Location detector 123 may be configured to generate a first line from the location of the image capturing device at the time the first image was captured to the first object in the first image, based on the observation heading of the first object observation in the first image and the location of the image capturing device at the time the first image was captured. In this example, the first object may also have been detected in a second image of the first unique ID set of images. In this case, metadata correlated to the second image may include a location of the image capturing device at the time the second image was captured. Location detector 123 may be configured to generate a second line running from the location of the image capturing device at the time the second image was captured to the first object in the second image, based on the observation heading of the first object observation in the second image and the location of the image capturing device at the time the second image was captured. This process may continue for all observations of the first object (e.g., for all images in which the first object was detected, which may be included in the unique ID set of images associated with the first object). The result may be, for each image in the unique ID set of images associated with the first object (e.g., each image of the unique ID set of images in which the first object is detected), a line running from the location of the capturing device at the time each respective image was captured to the object in each respective image. In embodiments, a similar process may be performed and applied to all observations (e.g., detections) of all unique objects associated with the unique ID sets of images. The result may be, for each unique detected object in the unique ID set of images, a plurality of lines, each line generated for a respective image in the unique ID set of images associated with the respective unique object, and each line representing a line running from the location of the capturing device at the time a respective image was captured to the object in the respective image.

In embodiments, all lines generated for a particular unique object (e.g., the lines generated for each image in the unique ID set of images associated with the particular unique object) may intersect at a single point, and the intersection point may represent the location of the particular unique object. In some embodiments, however, different lines generated for the particular unique object may intersect other lines at different points. In these embodiments, there may be a region of line intersections. In this case, location detector 123 may be configured to determine the location of the particular unique object by calculating a mean of all line intersections in the region of intersections. The same process may be applied to all detected object to determine the location of all detected objects. For example, location detector 123 may be configured to determine, for each unique object associated with a unique ID set of images of the unique ID sets of images, an intersection point for all possible combinations of pairs of the plurality of lines generate for each unique object. For example, an intersection point may be determined for each combination pair of lines of a plurality of lines generated for a first unique object. In this example, the number of determined intersection points may be equal to the number of possible different pair combinations of the plurality of lines. The intersection points may form a region of line intersections. In some embodiments, location detector 123 may discard pair combinations that have an intersection angle less than a predetermined threshold, in which case the intersection points for these line pairs may not be included in the location determination of an object. In embodiments, the location (e.g., as GPS coordinates) of an intersection point of a pair of lines may be obtained using an aviation formulary. In this manner, a location for all intersections points in the region of line intersections for a unique detected object may be obtained using the aviation formulary. Location detector 123 may be configured to calculate the location (e.g., the real-world location) of a unique detected object by calculating the mean of the locations of all the intersection points in the region of line intersections for the unique detected object. The determined location of each unique object is provided to I/O module 120 for output generation.

Figure 4:
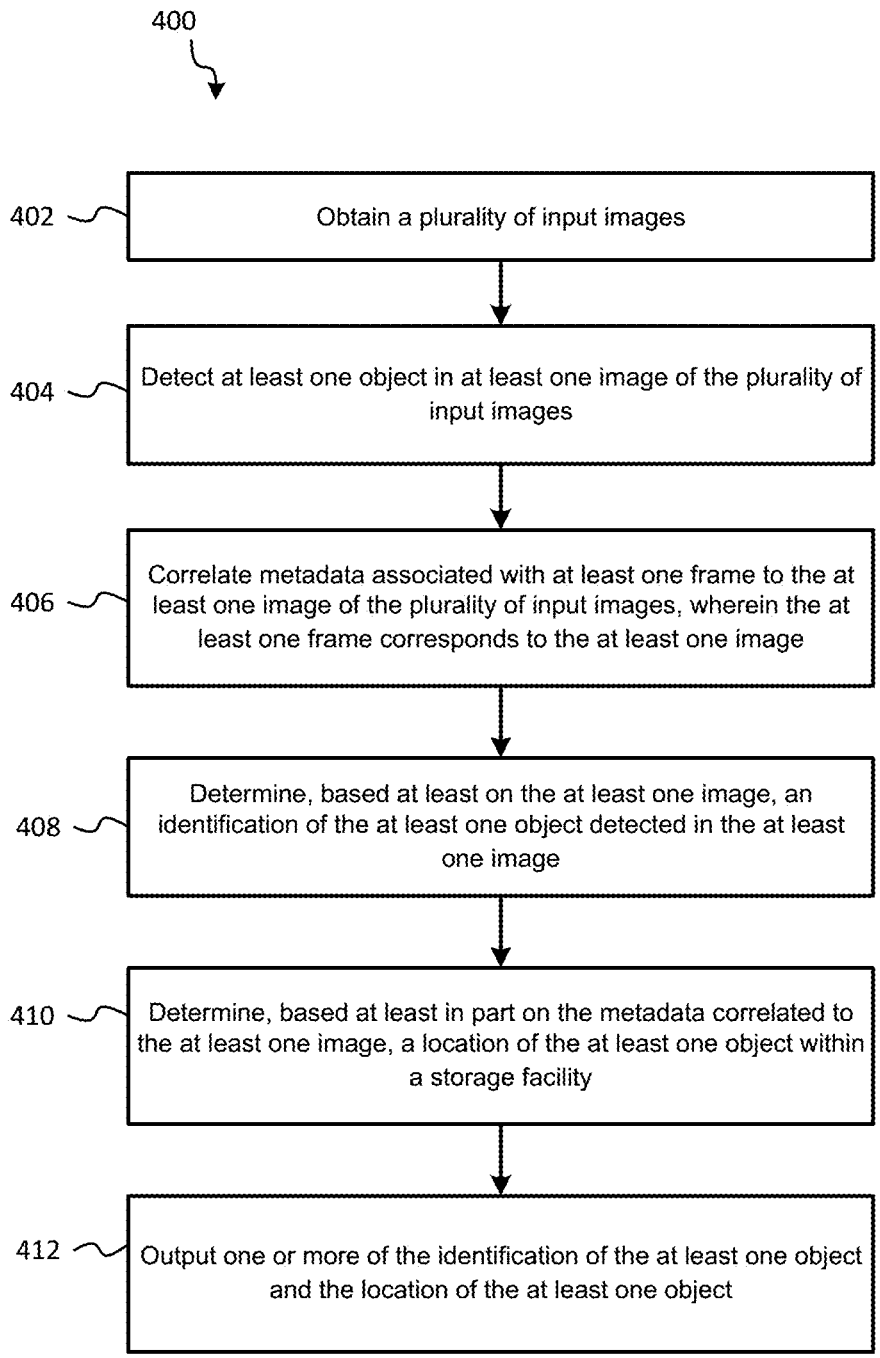
FIG. 4 shows a high-level flow diagram 400 of operation of a system, in accordance with embodiments of the present disclosure.

FIG. 4 shows a high-level flow diagram 400 of operation of a system configured in accordance with embodiments of the present disclosure for providing automated inventory control. For example, the functions illustrated in the example blocks shown in FIG. 4 may be performed by system 100 of FIG. 1 according to embodiments herein. In embodiments, the operations of the method 400 may be stored as instructions that, when executed by one or more processors, cause the one or more processors to perform the operations of the method 400.

At block 402, a plurality of input images is obtained. In some embodiments, the input images may include a plurality of images received from a capturing device (e.g., capturing device 130 of FIG. 1), or may be a plurality of images obtained by splitting image data received from the capturing device into the plurality of images. In embodiments, operations to obtain the plurality of input images may be performed according to operations and functionality as described above with reference to system 100 as illustrated in FIGS. 1-3.

At block 404, at least one object in at least one image of the plurality of input images is detected. In embodiments, functionality of an image processor (e.g., image processor 121) may be used to detect at least one object in at least one image of the plurality of input images. In embodiments, the image processor may perform operations to detect at least one object in at least one image of the plurality of input images according to operations and functionality as described above with reference to image processor 121 and as illustrated in FIGS. 1-3.

At block 406, metadata associated with at least one frame is correlated to the at least one image of the plurality of input images. In embodiments, the at least one frame may correspond to the at least one image. In embodiments, functionality of an image processor (e.g., image processor 121) may be used to correlate metadata associated with at least one frame to the at least one image of the plurality of input images. In embodiments, the image processor may perform operations to correlate metadata associated with at least one frame to the at least one image of the plurality of input images according to operations and functionality as described above with reference to image processor 121 and as illustrated in FIGS. 1-3.

At block 408, an identification of the at least one object detected in the at least one image is determined based at least on the at least one image. In embodiments, functionality of an image processor (e.g., image processor 121) may be used to determine, based at least on the at least one image, an identification of the at least one object detected in the at least one image. In embodiments, the image processor may perform operations to determine, based at least on the at least one image, an identification of the at least one object detected in the at least one image according to operations and functionality as described above with reference to image processor 121 and as illustrated in FIGS. 1-3.

At block 410, a location of the at least one object within a storage facility is determined based at least in part on the metadata correlated to the at least one image. In embodiments, functionality of a location detector (e.g., location detector 123) may be used to determine, based at least in part on the metadata correlated to the at least one image, a location of the at least one object within a storage facility. In embodiments, the location detector may perform operations to determine, based at least in part on the metadata correlated to the at least one image, a location of the at least one object within a storage facility according to operations and functionality as described above with reference to location detector 123 and as illustrated in FIGS. 1-3.

At block 412, one or more of the identification of the at least one object and the location of the at least one object is output. In embodiments, functionality of an I/O module (e.g., I/O module 120) may be used to output one or more of the identification of the at least one object and the location of the at least one object. In embodiments, the I/O module may perform operations to output one or more of the identification of the at least one object and the location of the at least one object according to operations and functionality as described above with reference to location detector 123 and as illustrated in FIGS. 1-3.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An automated inventory control system, comprising:
    an unmanned aerial vehicle configured to traverse an intermodal storage facility following a flight route;
    a processor configured to detect at least one object in at least one image of a plurality of input images received from the unmanned aerial vehicle; and
    a memory operably coupled to the processor and storing processor-readable code that, when executed by the processor, is configured to:
        inspect each object detected in each image of the set of images;
        determine a horizontal pixel location of a center of an object detected in the image;
        determine a relative angle from the unmanned aerial vehicle to the object;
        determine an object heading based on a heading of the unmanned aerial vehicle;
        generate, for each object detection in each image of the set of images, a line that is based on the observation heading for each object detection and a location of the image capturing device at the time the image was captured; and
        determine a location of the particular unique object by calculating a mean of all line intersections in a region of intersections for all observations of the object.

2. The system of claim 1, wherein the plurality of input images are received from an image capturing device operably coupled to the unmanned aerial vehicle.

3. The system of claim 1, wherein the processor-readable code is further configured to correlate metadata associated with at least one frame to the at least one image of the plurality of input images.

4. The system of claim 1, wherein the processor-readable code is further configured to determine, based at least on the at least one image, an identification of the at least one object detected in the at least one image.

5. The system of claim 1, wherein inspecting an object includes determining a condition and location of the object.

6. The system of claim 5, wherein determining a condition of each object detected in each image of the set of images includes applying a trained machine learning (ML) model to each image to detect a condition of each object detected in each image.

7. The system of claim 6, wherein the trained ML model is configured to analyze an image and determine any damage to the at least one detected object, whether the at least one detected object is open or closed, whether the at least one detected object is positioned correctly, or whether the at least one detected object is an empty slot.

8. The system of claim 1, wherein the relative angle is determined based on the following equation:

$$\beta = \frac{P_o}{W} \times \theta_{FOV},$$

where $\theta_{FOV}$ represents a field of view of the image capturing device as an angle and W represent the width of the image in which the object is detected in pixels.

9. The system of claim 8, wherein the object heading is determined based on the following equation:

$$\theta_{Heading}^{Object} = \theta_{Heading}^{Camera} - \beta.$$

10. The system of claim 1, further comprising discarding line pair combinations that have an intersection angle less than a predetermined threshold.

11. A method of determining a heading of an observation of an object in an image including:
   receiving a plurality of input images from an unmanned aerial vehicle;
   correlating metadata associated with at least one frame to the at least one image of the plurality of input images;
   determining, via a location detector, a horizontal pixel location of a center of an object detected in the image;
   determining an object heading based on a heading of the image capturing;
   generating, for each object detection in each image of the set of images, a line that is based on the observation heading for each object detection and a location of the image capturing device at the time the image was captured; and
   determining a location of the particular unique object by calculating a mean of all line intersections in a region of intersections for all observations of the object.

12. The method of claim 11, wherein the plurality of input images are received from an image capturing device operably coupled to the unmanned aerial vehicle.

13. The method of claim 11, further comprising determining a relative angle from the image capturing device to the object.

14. The method of claim 11, wherein the image processor determines, based at least on the at least one image, an identification of the at least one object detected in the at least one image.

15. The method of claim 11, wherein inspecting an object includes determining a condition and location of the object.

16. The method of claim 15, wherein determining a condition of each object detected in each image of the set of images includes applying a trained machine learning (ML) model to each image to detect a condition of each object detected in each image.

17. The method of claim 16, wherein the trained ML model is configured to analyze an image and determine any damage to the at least one detected object, whether the at least one detected object is open or closed, whether the at least one detected object is positioned correctly, or whether the at least one detected object is an empty slot.

18. The method of claim 13, wherein the relative angle is determined based on the following equation:

$$\beta = \frac{P_o}{W} \times \theta_{FOV},$$

where $\theta_{FOV}$ represents a field of view of the image capturing device as an angle and W represent the width of the image in which the object is detected in pixels.

19. The method of claim 18, wherein the object heading is determined based on the following equation:

$$\theta_{Heading}^{Object} = \theta_{Heading}^{Camera} - \beta.$$

20. The method of claim 11, further comprising discarding line pair combinations that have an intersection angle less than a predetermined threshold.

* * * * *